(12) United States Patent
Müller et al.

(10) Patent No.: US 8,234,300 B2
(45) Date of Patent: Jul. 31, 2012

(54) ACCESS TO ELECTRONIC SOCIAL NETWORKS

(75) Inventors: Samuel Müller, Zürich (CH); Dieter M. Sommer, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/246,632

(22) Filed: Oct. 7, 2008

(65) Prior Publication Data

US 2010/0088340 A1  Apr. 8, 2010

(51) Int. Cl.
*G06F 7/00* (2006.01)
*G06F 17/30* (2006.01)

(52) U.S. Cl. ........ 707/781; 707/790; 709/213; 709/217; 709/220

(58) Field of Classification Search .................. 707/705, 707/790, 821, 781; 709/223, 216, 225, 213, 709/217, 220; 715/753
See application file for complete search history.

(56) References Cited

U.S. PATENT DOCUMENTS

| | | | |
|---|---|---|---|
| 7,167,910 B2 * | 1/2007 | Farnham et al. | 709/223 |
| 2002/0124053 A1 * | 9/2002 | Adams et al. | 709/216 |
| 2004/0088325 A1 * | 5/2004 | Elder et al. | 707/104.1 |
| 2005/0021750 A1 * | 1/2005 | Abrams | 709/225 |
| 2006/0218225 A1 * | 9/2006 | Hee Voon et al. | 709/201 |
| 2007/0174304 A1 * | 7/2007 | Shrufi et al. | 707/100 |
| 2008/0005125 A1 * | 1/2008 | Gaedeke | 707/10 |
| 2008/0070209 A1 * | 3/2008 | Zhuang et al. | 434/236 |
| 2008/0250332 A1 * | 10/2008 | Farrell et al. | 715/753 |
| 2009/0319288 A1 * | 12/2009 | Slaney et al. | 705/1 |
| 2010/0191844 A1 * | 7/2010 | He et al. | 709/224 |

* cited by examiner

*Primary Examiner* — Giovanna Colan
(74) *Attorney, Agent, or Firm* — Cantor Colburn LLP; Daniel Morris

(57) ABSTRACT

A method comprising, defining a social network $U=\{u, u', \ldots\}$, defining a set of relationships between users $O \subset U \times U$, defining a set of attributes of the social network $\overline{A}=\{a_1, a_2, \ldots\}$, defining a set of contacts of the user u, defining a user profile of the user u $I_u = A_u \cup U_u$, defining a metric $M=\{m_1, m_2, \ldots\}$, receiving a rating of a metric of user u' from the user u, defining a condition $c \in C$, defining a set of elements $Z=\{z_1, z_2, \ldots\}$, receiving a request for access to $I_u$ from user u', determining authorization for user u' to access a subset of $I_u$ by an access control function $U \times U \times Pow(R) \times C \rightarrow Pow(I_u \times Z)$, and outputting a subset of $I_u$ to user u' as determined by the access control function.

11 Claims, 2 Drawing Sheets

ACCESS TO ELECTRONIC SOCIAL NETWORKS

BACKGROUND

This invention relates generally to electronic social networks, and more particularly, to methods involving access to data on electronic social networks.

Besides the economic value of electronic social networks, they also have a potential in supporting people in extending their real-world social network into the electronic domain. Currently existing electronic social networks do not model the real world appropriately as they allow only very crude control of which other users in the network may access which fraction of personal and contact information of a user.

For example, when asked to become a contact of another user, a user faces a binary decision on whether to accept or reject this connection request, thereby allowing or disallowing the requesting user full access to his personal and contact information. This may result in awkward situations particularly when users do not dare to reject requested connections. Overall, these factors may decrease the value of the network on the one hand, and increase the threshold of accepting new users as contacts on the other hand. Thus, the social networks are currently based on insufficiently simple assumptions. The lack of flexibility creates an entrance barrier for many users and hinders potential users in participating in the social network.

An efficient method of controlling access to data on an electronic social network is desired.

BRIEF SUMMARY

The shortcomings of the prior art are overcome and additional advantages are achieved through an exemplary method comprising defining a social network as a set of users $U=\{u, u', \ldots\}$, defining a set of relationships between users $O \subset U \times U$, wherein $(u, u') \in O$ responsive to user $u \in U$ and user $\overline{u' \in U}$ mutually agreeing to enter a relationship, defining a set of attributes of the social network $A=\{a_1, a_2, \ldots\}$, wherein $A_u \subset A$ denotes a set of the attributes of the user u, defining a set of contacts of the user u, wherein $U_u:=\{u'|(u,u') \in O\}$, defining a user profile of the user u $I_u = A_u \cup U_u$, defining a metric $M=\{m_1, m_2, \ldots\}$ where a metric $m_i$ is a tuple (name, range, type), wherein $M_{u'}$ includes metrics associated with the user u', receiving a rating of a metric of user u' from the user u, wherein a pair $(m_{u',i}, v_i)$ denotes the rating of a metric of user u', V defines a universe of types, and $R_{uu'}=\{(m_{u',1}, v_1), \ldots, (m_{u',k}, v_k)\}$ denotes a set of ratings of the user u' defined by the user u, defining a condition $c \in C$, wherein C is a set of conditions operative to determine authorization of access to $I_u$, defining a set of elements $Z=\{z_1, z_2, \ldots\}$, wherein $z_n$ includes an access category associated with $I_u$, receiving a request for access to $I_u$ from user u', determining authorization for user u' to access a subset of $I_u$ by an access control function $U \times U \times Pow(R) \times C \rightarrow Pow(I_u \times Z)$, and outputting a subset of $I_u$ to user u' as determined by the access control function to a user terminal for display to the user.

A system comprising, a server operative to, define a social network as a set of users $U=\{u, u', \ldots\}$, define a set of relationships between users $O \subset U \times U$, wherein $(u, u') \in O$ responsive to user $u \in U$ and user $\overline{u' \in U}$ mutually agreeing to enter a relationship, define a set of attributes of the social network $A=\{a_1, a_2, \ldots\}$, wherein $A_u \cup A$ denotes a set of the attributes of the user u, define a set of contacts of the user u, wherein $U_u:=\{u'|(u,u') \in O\}$, define a user profile of the user u $I_u = A_u \cup U_u$, define a metric $M=\{m_1, m_2, \ldots\}$ where a metric $m_i$ is a tuple (name, range, type), wherein $M_{u'}$ includes metrics associated with the user u', receive a rating of a metric of user u' from the user u, wherein a pair $(m_{u',i}, v_i)$ denotes the rating of a metric of user u', V defines a universe of types, and $R_{uu'}=\{(m_{u',1}, v_1), \ldots, (m_{u',k}, v_k)\}$ denotes a set of ratings of the user u' defined by the user u, define a condition $c \in C$, wherein C is a set of conditions operative to determine authorization of access to $I_u$, define a set of elements $Z=\{z_1, z_2, \ldots\}$, wherein $z_n$ includes an access category associated with $I_u$, receive a request for access to $I_u$ from user u', and determine authorization for user u' to access a subset of $I_u$ by an access control function $U \times U \times Pow(R) \times C \rightarrow Pow(I_u \times Z)$, and a terminal operative to receive and display a subset of $I_u$ to user u' as determined by the access control function.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The embodiments described below improve upon social network concepts by giving users improved control over which fraction of their personal and contact information is made accessible to particular users. The embodiments include a method allowing users to rate other users with respect to a number of system or user-defined metrics and to derive access and navigation rights from these ratings.

Figure 1:
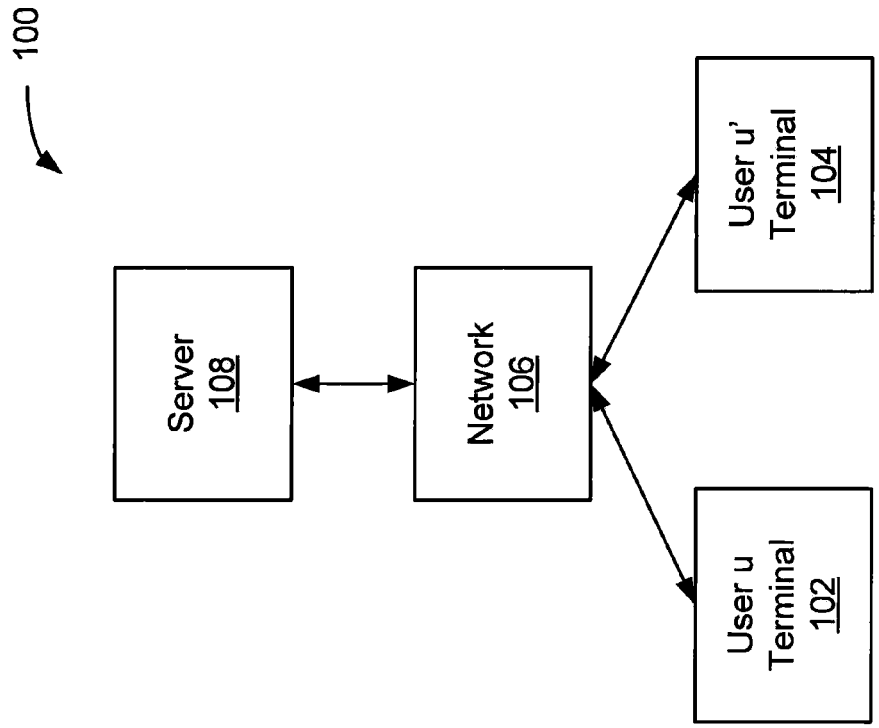
FIG. 1 illustrates an exemplary embodiment of an electronic social network system.

FIG. 1 illustrates an exemplary embodiment of an electronic social network system. A network 100 includes a user u terminal 102, and a user u' terminal 104 communicatively connected to a server 108 via a network 106. The user terminals may include, for example a personal computer, a personal digital assistant, or another type of communications device. The network 106 may include, for example, the Internet, an intranet, or other type of communications medium. The server 108 is shown in the illustrated embodiment as a separate processor, however, the functions of the server may in alternate embodiments be performed by one of the user terminals, or a combination of user terminals.

The embodiments let a user u, after having accepted a binary request of being connected to a user u', rate the user u'. The system then determines in an automated method what profile information of user u user u' may access, where this decision is based on the ratings and additional conditions as outlined further below. This profile information includes both personal information (attributes), and contact information of u (references to users). Access to such information may include read, write, and delete access, but may also include more complex access types such as the right to delegate own access rights to other users or the execution of user-defined or system-defined operations processing profile information.

Figure 2:
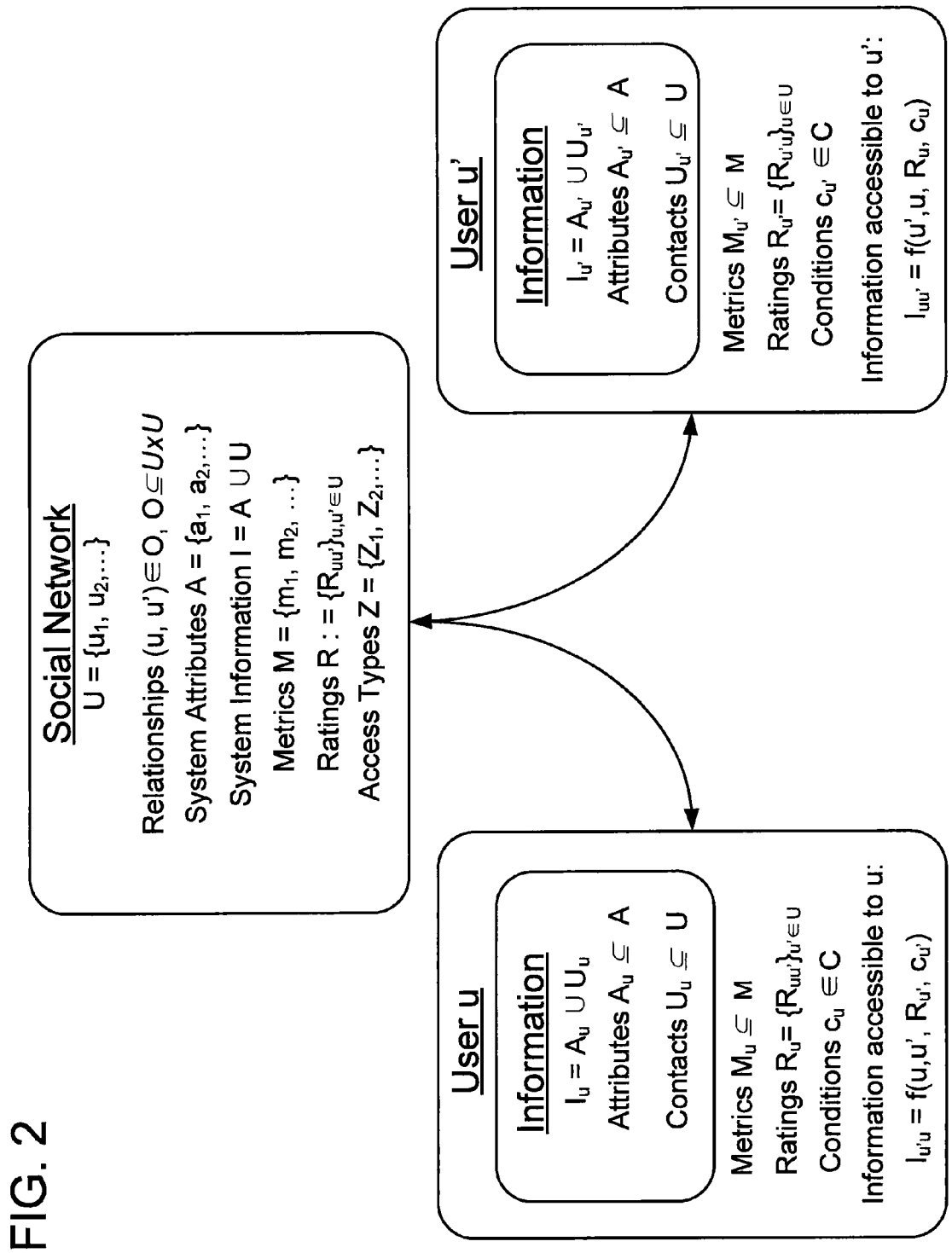
FIG. 2 illustrates a block diagram of an exemplary embodiment of access control of users in the electronic social network of FIG. 1.

FIG. 2 illustrates a block diagram of an exemplary embodiment of access control of users in the electronic social network 100. FIG. 2 includes a social network having a variety of users, relationships, attributes, and other access control data detailed below. The user u and the user u' and associated information and access control data are also illustrated, and will be described below.

The social network comprises a set of users $U=\{u_1, u_2, \ldots\}$ where the actual subset of active system users is finite. A user may be, for example, a human being, a software agent, an avatar (as used in virtual worlds), or any sort of computer-representable actor. Each user has a profile associated and typically wants to share some specific subset of the information in his profile with selected other users in the network.

The methods help the user to manage which subset of his profile information can be accessed (i.e., read, written, deleted, etc.) by which other users. The basic paradigm is to automate those decisions, and thus help the user to manage large sets of relationships to other users without an excessive administrative overhead. That is, a user is empowered to manage a much larger social network than he is able to manage presently, thus potentially creating additional value for the user.

In operation let $O \subset U \times U$ be the set of relationships between users. If a user $u \in U$ has a relationship to a user $u' \in U$, we have that $(u, u') \in O$. Because the relation O is symmetric, we also have $(u', u) \in O$. User u' is a contact of user u, and vice versa. The relation O contains a tuple (u, u') if and only if the two parties have mutually agreed to enter a relationship by executing some protocol (e.g., user u requests to add user u' to his contact list; user u' accepts this request.).

Users u and u' who have a relationship (i.e., the tuple (u, u') is in the relation O) are said to belong to each other's personal networks. Furthermore, if $(u, u') \in O$, u' is said to be a contact of u.

A user profile consists of the user personal information (i.e., attributes) and the user contacts, where an attribute a is a tuple (name, type, value), with an example name "Skillset", an example associated data type "listofstrings", and an example value "[Java, C++]". An attribute may, for example, be of type multi-valued attribute, string, Boolean, or integer. The exemplary embodiments do not constrain the types. A contact of a user u is another user u'. Contacts may be de-referenced (navigation of the contact) so that the de-referenced profile information of a contact may be accessed. De-referencing a contact u' of a user u means to access profile information of u'.

Let the set $A=\{a_1, a_2, \ldots\}$ denote the set of all attributes of the system. Let $A_u \subset A$ denote the set of the attributes of the user u.

Let the set $U_u \subset U$ be the set of contacts of the user u. We have that $U_u:=\overline{\{u'|(u,u') \in O\}}$. That is, the contacts are expressed by the set of users u has a relationship with.

Let $I_u=A_u \cup U_u$ with $A_u \subset A$ and $U_u \subset U$ be the information of user u known by the system, that is, the user profile information. This information is the information that is available to other users, but restricted through our access control solution: The embodiments allow other users to access subsets of $I_u$ as appropriate according to ratings by u of the other users and other contextual information.

Attributes can (in addition to modeling user properties) also be used to model contextual variables such as time or to keep state between different evaluations of the access control function. This adds substantial power to the access control semantics that can be expressed. For example, a user can keep an attribute for each of his contacts that maintains the time since the connection with the contact has been established. This allows for maintaining relationship meta-information in attributes for each contact of a user u and having this information influence access control decisions. A practical example restricts access to certain attributes for users that have just joined u's network and to increase privileges over time.

There is an infinitely countable set $M=\{m_1, m_2, \ldots\}$ of metrics defined where a metric $m_i$ is a tuple (name, range, type). A metric may be associated with an attribute or a set of attributes, a contact or a set of contacts, or a set of attributes and contacts. For example, the metric ("Competence", [1 ... 10], ordinal) can be associated with the attribute a=("Skillset", listofstrings, [Java, C++]) of a user u, where "Skillset" expresses a set of programming languages the user understands. A metric can conceptually also be associated directly with a user u, by associating it with the set of all attributes and contacts $A_u \cup U_u$ of the user u. An example metric for which this may be useful is "Trust". A metric can be rated by a user as shown later. Let $M_u$ be all metrics associated with the profile information of a particular user.

Given a user $u \in U$ and a metric $m \in M_u$, the function assignMetrics, with the signature assignMetrics: $(U \times M) \rightarrow Pow(A \cup U)$, maps the pair (u, m) to a possibly empty set $\{a_1, \ldots, a_m, u_1, \ldots, u_n\}$ of attributes, contacts, or attributes and contacts, where $a_i \in A_u$ and $u_j \in U_u$. That is, the function assignMetrics identifies all the attributes or contacts of u that are associated to metric m.

A user $u \in U$ may rate a contact $u' \in U$, with $(u, u') \in O$, using the partial function rate, with the signature rate: $U \times U \rightarrow Pow(M \times V)$, mapping a pair (u, u') to a set of pairs $\{(m_{u',1}, v_1), \ldots, (m_{u',i}, v_i)\}$, where a pair $(m_{u',i}, v_i)$ denotes the rating of a single metric of user u', $m_{u',i} \in M_{u'}$, and where V denotes the universe of all values of all types that can be used in the system. We let $R_{uu'}=\{(m_{u',1}, v_1), \ldots, (m_{u',k}, v_k)\}$ denote the set of ratings of a user u' performed by u. We use $R:=\{R_{uu'}\}_{u,u'} \in U$ to denote the set of all ratings. A user may also perform a self-rating. Typically, self-ratings have no effect on u's access to the u profile information.

Whenever a user u has accepted a new user u' in his personal network, that is, after (u, u') has been added to O, u may rate u'. The ratings are then used to determine the access rights of u' to the profile information $I_u$ of user u. Ratings between a user u and a contact u' can be repeated and adapted an arbitrary number of times. Because the relation O is symmetric, both the user u rates user u' and user u' rates user u, thus both users define semantics for visibility of their profile to the other user.

For example, let u, u'∈U be users with (u, u')∈O. As above, consider the attributes $a_1$=("Skillset", listofstrings, [Java, C++]), $a_2$=("Experience", listofstrings, [ProjectA, ProjectB, ProjectC]), and $a_3$=("CV", listofstrings, [item1, item2, item 3, ..., item22]), the metric m=("Competence", [1 ... 10], ordinal), where assignMetrics(u', m)={a1, a2, a3}. This means that the metric m of user u' is assigned to the set {a1, a2, a3} of attributes of user u'. Now, user u may rate user u' so that metric m is associated with a value that matches m's type, using the function rate (u, u')={(m, 7)}. In words, user u rates the metric m of user u' with an ordinal value of 7.

In addition to the above-described ratings, we use the concept of conditions to model any kind of rules that determine the access to a user u's profile information $I_{u'}$, that is. Let C be a countable set of conditions expressible in some computerinterpretable language, e.g., XACML or first-order logic. A condition c∈C can be either system-defined or defined by a user. Conditions are expressed over the vocabulary induced by the sets R, A, U, and O.

For example, conditions influencing which subset of profile information a user u' may access of a user u may be:

the value of an attribute a∈A with the name "age" belonging to a user profile $I_{u'}$ must be larger than 30.

the number of contacts u" that a user u' has needs to be larger than 20, i.e., 20<|{u"|(u',u")∈O and u"∈U}|.

the number of contacts u" that themselves fulfill a certain condition c (e.g., have received a high rating, demonstrate special experience, are managers, etc.) that a user u' has is larger than 15, i.e., 15<|{u"|(u',u")∈O and u"∈U and u" fulfills c}|.

Conditions are dependent on the real-life semantics of attributes and contacts, for example, more stringent conditions will be applied to sensitive attributes than would be applied to almost public attributes. The method provides a predefined basic set of parameterizable conditions that are expected to be sufficient for the majority of users and use cases will be provided by the electronic social network. These conditions are modeled following the real-life semantics of attributes and contacts in social networks. Users who want more fine-grained control over their information are able to customize conditions and add new conditions to implement their intended access control semantics for their profile information. Those user-specific conditions are then used only for access decisions to profile information of the defining user.

An access control function and accessible profile information functions are described below. Let the infinite but countable set Z={read, write, delete, delegate, execute, ...} contain the different types how profile information can be accessed. We do not constrain the elements of the set Z.

The access control function $f: U \times U \times Pow(R) \times C \rightarrow Pow(I_u \times Z)$ then determines which subset of the profile information of u another user u' may access in which way. As inputs the function requires two users u, u'∈U, where typically (u,u')∈O, and thus also (u',u)∈O. Under special circumstances, the access control function may grant a user u access to the profile information of a user u' also when u and u' are no mutual contacts, for example, when user u is the system administrator. The ratings R'∈Pow(R) are a key input for the computations performed by the access control function as they govern to a large extent the accessibility of the information of u to u'. Not only ratings made about u' by u, but any ratings by any user may flow into the computation performed by the access control function. A particular example are ratings of u' by other users $u_1, \ldots, u_k$, where $u_i \neq u$, for all i, $1 \leq i \leq k$ where those ratings are considered in the access decision as well. Finally, the condition c∈C over the vocabulary induced by R, A, U, and O that may further be provided as input refines the access control function, that is, adds additional semantics for computing the access decision. The condition language can express conjunction, thus a single condition is sufficient as input as a set of conditions that are connected by logical conjunction may be expressed in one condition c.

The set $I_{uu'} \in Pow(I_u \times Z)$ is the profile information of user u that u' can access, as determined by the access control function. Accessing a data item can, for example, be reading it, writing it, deleting it, or executing an arbitrary operation. The set $I_{uu'}$ contains tuples from i×Z. For example, $I_{uu'}=\{(a_1, \text{read}), (a_4, \text{write}), (u", \text{read})\}$ defines that u' may read $a_1$ of u, write $a_4$ of u, and read contact u" of u. That is, the set $I_{uu'}$ defines in a fine-grained way what u' may access of u; this semantics is enforced accordingly by the access control enforcement subsystem.

For example, consider a user u' with the attributes $a_1$=("Skillset", listofstrings, ["Java", "C++"]), $a_2$=("Experience", listofstrings, ["ProjectA", "ProjectB", "ProjectC"]), and $a_3$=("CV", listofitems, [item1, item2, item3, ..., item22]), a metric m=("Competence", [1...10], ordinal), the function assignMetrics(u', m)=$\{a_1, a_2, a_3\} \cup \{u|u \in U_{u'}\}$, a rating rate(u,u')={(m,7)} by a user u∈U with (u, u')∈O, and an additional attribute a'=("age", integer, 35), where a'∈$I_{u'}$. Moreover, we let R':=7).

In a specific instantiation of the access control function $f$, user u' may then access the attributes $a_{10}$=("Skillset", listofstrings, ["Java", "Net", "DB2"]), $a_{11}$=("Careergoal", string, "CTO"), and $a_{12}$=("CV", listofitems, [itemA, itemB, itemC, itemD]) of u and attributes with the same names of all contacts $\{u_1, \ldots u_m\} = \subset U_u$ of u, whose metric with name "Competence" has received a rating of 7 or less by u, if and only if u' is at least 30 years old (i.e., the attribute a' with name="age" has a value of at least 30) and u' has more than 20 contacts in total (i.e., 20<|{u"|(u',u")∈O and u"∈U}|) (If c represents this condition, the result of the function $f$ (u, u', R', c) would be $\{(a_{10}, \text{read}), (a_{11}, \text{read})' (a_{12}, \text{read}), (u_1, \text{read}), \ldots, (u_k, \text{read}), (a_{10,u1}, \text{read}), (a_{11}, u_1, \text{read}), (a_{12,u1}, \text{read}), \ldots, (a_{10,uk}, \text{read}), (a_{11,uk}, \text{read}), (a_{12,uk}, \text{read})\}$, where $u_1, \ldots, u_k$ are the contacts of u' that satisfy condition c, and $a_{10,u1}, \ldots, a_{12,uk}$ are the corresponding attributes of these users).

The above example illustrates how u may restrict access to his profile information to the above-mentioned attributes and the corresponding attributes of his contacts with ratings as constrained in the example. Hence, user u' can only access a subset of the profile information $I_u$ of user u, and, by using conditions, he may only do so if he is also older than 30 and has more than 20 contacts in total. Other attributes of u, all highly-competent contacts of u (i.e., those who have been rated higher than 7 by u in terms of "Competence"), and all other attributes of the visible contacts of u are hidden from u'. Thus, access to contacts can be limited by not showing contacts of u to u' that have a higher competence rating than the rating that u has given to u'. This allows users to model real-life social networking more properly where information is also selectively divulged to other users based on the assessment of the potential information recipients.

Some exemplary embodiments include extensions that add additional functionality. For example, partial attribute accessibility may be a feature of the access control function such that attributes are 'partially visible', i.e., a user u' can see that a user u has an attribute with name "XYZ", however, he cannot see the value of this attribute. In other circumstances, the user u' does not see that user u has an attribute with a name "XYZ". This can be useful if the existence of an attribute already reveals sensitive information about a user. For attributes of complex data types, such as, for example, lists, sets, or aggregates, the access control function may also only reveal a part of values in the lists, sets, or aggregates. For example, in a list of items representing prior work experience, only the most recent two items from that list could be made accessible to some contact u'. This feature may be controlled by conditions in an appropriately expressive condition language and again be definable by both the system or individual users.

Rating visibility control may also be incorporated into the access control function. Ratings may be declared 'private', 'semi-private', 'contact-public', or 'public' by a rated user u':

The result of a private rating of a user u' performed by a contact u is neither visible to u' nor to any other user $_u" \in U$, except u.

The result of a semi-private rating can be seen by both the rating user u and the rated user u'. Other users $u''\in U$ cannot see the rating.

The result of a contact-public rating of user u' performed by contact u is accessible to all contacts of users u' and to u'. Other system users cannot see the rating.

The result of a public rating of user u' performed by contact u is accessible to all system users $u''\in U$.

While private, semi-private, and contact-private ratings provide different levels of privacy, public ratings are a particularly interesting means for politicians to assess their credibility, election chances, or general public perception. Users who rate themselves can have the system compute the bias between the self-assessment and the external perception.

Provisional actions and obligations may also be used in the access control function. A 'provisional action' is a condition that has to be fulfilled before u' will be accepted as a contact by u and 'obligations' are conditions have to be fulfilled by u' after he has been tentatively accepted as a contact by u or some other user u'. In addition, a low-value user u' may only have access to a minimal set of profile information of u without being able to access any of u's contacts.

A prominent situation in the context of real-life social networking is a user u' with 'low-valued' connections requesting to be accepted as a contact to a user u with 'high-valued' connections. For example, a student with only few contacts to high-profile researchers requesting to connect to his advisor with an extensive contact network to the research community in the field of the advisor. In such a situation, the high-valued user does typically not want to expose all his high-value contacts and attributes to the other user. However, he still may want to share some information with the other user in order to profit from the contact u' on the one hand and provide some value to u' on the other hand without compromising his privacy. In previous social networks, such a situation of low-value to high-value connection, the decision would often be a reject for a user u who is concerned about his privacy.

Bring your Friend (Mandatory). An example for a provisional action is that u can require u' to bring in a number of k contacts into the network of u that fulfill a certain condition (e.g., researchers with a high rating in terms of "Competence", or members of a certain industry with a minimum management level). Only if u' can fulfill this condition, he will be admitted by u. This approach allows both u and u' to benefit from the newly established relationship and thus will add substantial value to the social network.

The bring-your-friend scheme can be extended by not only defining provisions as above, but also defining obligations from u' in the future after being added to u's network. For example, when combining both approaches, u could require two friends fulfilling a certain condition before joining and 6 more friends fulfilling a different condition within 3 months. If the latter is not fulfilled, u would be automatically (optionally, with u's consent) be removed from u's network.

Bring your Friend (Optional) is similar to bringing a friend (Mandatory), but the condition being optional. This scheme may be particularly interesting for a high-value user u who has a contact u" looking for a specific skill (of no importance to u) that the low-value user u' can offer. Then, the high-value user u may require u' to also accept u" as a direct connection so that u" can benefit from the specific skill of u'.

In a "god-father-like" manner, a user u may accept to enter a relationship with a user u', but may only will in to do so contingent on u' promising to fulfill a yet undefined or parameterizable future obligation. User u' will then be admitted to the personal network of u, however, at some point in the future, he will be asked to "return u a favor", that is, to fulfill the initially promised obligation, which is then—upon request by u—formulated or defined in detail by u. If u' fails to live up to his promise and cannot fulfill the obligation, pre-agreed consequences will apply (i.e., u' getting removed from the contact list of u, perform a compensational action, a combination thereof, etc.).

Drawing again on real-world experience, people prefer to have different roles in which they interact with other people. A role can be seen as a set (i.e., group) of attributes associated with the role and a set of contacts being associated with the role as well. For example, people have different attributes for their family life and work life and typically also the sets of contacts are different, but not necessarily disjoint.

Groups can be put into relation with one another, resulting, in the case of a simple example, in a hierarchy. This relation then can be used to determine the visibility of attributes and contacts in a more general way. For example, people in a group at the top of a hierarchy can see all groups below the group they are in, that is, a user in the "Friends" group can see attributes and contacts in the "Work" group assuming "Friends" is above "Work" in the hierarchy. People in the "Work" group can not see people in the "Friends" group or attributes associated with the "Friends" group.

General ontology-based mechanisms can be used to define relations between groups and rules can govern what parts are visible under what conditions. This allows for implementing quite general visibility.

The preferred implementation of the system is a distributed system using the client-server paradigm. The server is preferably implemented using the J2EE or .Net frameworks. Data is stored using a DB2 or other relational database system. A client solution based on a Web interface as usual for social networks in keeps the entrance barrier as low as possible. Web 2.0 technology such as AJAX (asynchronous JavaScript) is preferably used for creating a best user experience in a browser-based application.

The technical effects and benefits of the above described embodiments provide a method for efficient and effective user access control for electronic social networks.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
defining a social network as a set of users $U=\{u, u', \ldots\}$;
defining a set of relationships between users $O \subset U \times U$, wherein $(u, u') \in O$ responsive to user $u \in U$ and user $u' \in U$ mutually agreeing to enter a relationship;
defining a set of attributes of the social network $A=\{a_1, a_2, \ldots\}$, wherein $A_u \subseteq A$ denotes a set of the attributes of the user u;
defining a set of contacts of the user u, wherein $U_u:=\{u' | (u,u') \in O\}$;
defining a user profile of the user u $I_u = A_u \cup U_u$;
defining a metric $M=\{m_1, m_2, \ldots\}$ where a metric $m_i$ is a tuple (name, range, type), wherein $M_{u'}$ includes metrics associated with the user u';
receiving a rating of a metric of user u' from the user u, wherein a pair $(m_{u',i}, v_i)$ denotes the rating of a metric of user u', V defines a universe of types, and $R_{uu'}=\{(m_{u',1}, v_r), \ldots, (m_{u',k}, v_k)\}$ denotes a set of ratings of the user u' defined by the user u;

defining a condition c∈C, wherein C is a set of conditions operative to determine authorization of access to $I_u$, wherein the condition c includes a number of contacts $U_{u'}$ of the user u';

defining a set of elements $Z=\{z_1, z_2, \ldots\}$, wherein $z_n$ includes an access category associated with $I_u$;

receiving a request for access to $I_u$ from user u';

determining authorization for user u' to access a subset of $I_u$ by an access control function $U \times U \times Pow(R) \times C \rightarrow Pow(I_u \times Z)$;

outputting a subset of $I_u$ to user u' as determined by the access control function to a user terminal for display to the user, wherein the user u agrees to enter a relationship with the user u' responsive to the user u' satisfying the condition c and the condition c includes a threshold number of k contacts the user u' has introduced to the user u; and withdrawing the agreement to enter a relationship with the user u' responsive to determining that the condition c has not been satisfied by the user u'.

2. The method of claim 1, wherein the subset of $I_u$ displayed to the user u' is $I_{uu'} \in Pow(L_u \times Z)$.

3. The method of claim 1, wherein the condition c includes an attribute $a_{u'}$ of the user u'.

4. The method of claim 1, wherein the condition c includes a defined temporal condition, wherein the user u agrees to enter a relationship with the user u' responsive to the user u' satisfying the condition c within the temporal condition.

5. The method of claim 1, wherein the condition c includes a defined temporal threshold, and the method includes:

determining whether the condition c has been satisfied by the user u' responsive to determining that the temporal threshold has expired; and withdrawing the agreement to enter a relationship with the user u' responsive to determining that the temporal threshold has expired and that the condition c has not been satisfied by the user u'.

6. A system comprising:

a server operative to:

a server operative to:

define a social network as a set of users $U=\{u, u', \ldots\}$;

define a set of relationships between users $O \subset U \times U$, wherein $(u, u') \in O$ responsive to user $u \in U$ and user $u' \in U$ mutually agreeing to enter a relationship;

define a set of attributes of the social network $A=\{a_1, a_2, \ldots\}$, wherein $A_u \subset A$ denotes a set of the attributes of the user u;

define a set of contacts of the user u, wherein $U_u:\{u'|(u, u') \in O\}$;

define a user profile of the user u $I_u = A_u \cup U_u$;

define a metric $M=\{m_2, \ldots\}$ where a metric $m_i$ is a tuple (name, range, type), wherein $M_{u'}$ includes metrics associated with the user u';

receive a rating of a metric of user u' from the user u, wherein a pair $(m_{u',i,vi})$ denotes the rating of a metric of user u', V defines a universe of types, and $R_{uu'}=\{(m_{u',1},v_1), \ldots, (m_{u',k},v_k)\}$ denotes a set of ratings of the user u' defined by the user u;

define a condition c∈C, wherein C is a set of conditions operative to determine authorization of access to $I_u$, wherein the condition c includes a number of contacts $U_{u'}$ of the user u';

define a set of elements $Z=\{z_1, z_2, \ldots\}$, wherein $z_n$ includes an access category associated with $I_u$;

receive a request for access to $I_u$ from user u';

determine authorization for user u' to access a subset of $I_u$ by an access control function $U \times U \times Pow(R) \times C \rightarrow Pow(I_u \times Z)$, wherein the user u agrees to enter a relationship with the user u' responsive to the user u' satisfying the condition c and the condition c includes a threshold number of k contacts the user u' has introduced to the user u; and withdrawing the agreement to enter a relationship with the user u' responsive to determining that the condition c has not been satisfied by the user u'; and a terminal operative to receive and display a subset of $I_u$ to user u' as determined by the access control function.

7. The system of claim 6, wherein the subset of $I_u$ displayed to the user u' is $I_{uu'} \in Pow(i_u \times Z)$.

8. The system of claim 6, wherein the condition c includes an attribute $a_{u'}$ of the user u'.

9. The system of claim 6, wherein the condition c includes a defined temporal threshold, wherein the user u agrees to enter a relationship with the user u' responsive to the user u' satisfying the condition c within the temporal threshold.

10. The system of claim 6, wherein the condition c includes a defined temporal threshold, and the server is further operative to:

determine whether the condition c has been satisfied by the user u' responsive to determining that the temporal threshold has expired; and withdraw the agreement to enter a relationship with the user u' responsive to determining that the temporal threshold has expired and that the condition c has not been satisfied by the user u'.

11. A method comprising:

defining a social network as a set of users $U=\{u, u', \ldots\}$;

defining a set of relationships between users $O \subset U \times U$, wherein $(u, u') \in O$ responsive to user $u \in U$ and user $u' \in U$ mutually agreeing to enter a relationship;

defining a set of attributes of the social network $A=\{a1, a2, \ldots\}$, wherein Au ⊂ A denotes a set of the attributes of the user u;

defining a set of contacts of the user u, wherein $Uu:=\{u'|(u,u') \in O\}$;

defining a user profile of the user u lu=Au ∪ Uu;

defining a metric $M=\{m1, m2, \ldots\}$ where a metric mi is a tuple (name, range, type), wherein Mu' includes metrics associated with the user u';

receiving a rating of a metric of user u' from the user u, wherein a pair (mu', i, vi) denotes the rating of a metric of user u', V defines a universe of types, and Ruu'={(mu', 1, v1), . . . , (mu', k, vk)} denotes a set of ratings of the user u' defined by the user u;

defining a condition c ∈ C, wherein C is a set of conditions operative to determine authorization of access to lu wherein the condition c includes a number of k contacts the user u' has introduced to the user u;

defining a set of elements $Z=\{z1, z2, \ldots\}$, wherein zn includes an access category associated with lu;

receiving a request for access to lu from user u'; and determining authorization for user u' to access a subset of lu by an access control function $U \times U \times Pow(R) \times C \rightarrow Pow(lu \times Z)$, wherein the condition c includes a defined temporal threshold;

determining whether the condition c has been satisfied by the user u' responsive to determining that the temporal threshold has expired;

withdrawing the agreement to enter a relationship with the user u' responsive to determining that the temporal threshold has expired and that the condition c has not been satisfied by the user u';

outputting a subset of lu to user u' as determined by the access control function to a user terminal for display to the user, wherein the user u agrees to enter a relationship with the user u' responsive to the user u' satisfying the condition c and the condition c includes a threshold number of k contacts the user u' has introduced to the user u; and withdrawing the agreement to enter a relationship with the user u' responsive to determining that the condition c has not been satisfied by the user u'.

* * * * *